(12) United States Patent
Pandharipande et al.

(10) Patent No.: US 10,051,711 B2
(45) Date of Patent: Aug. 14, 2018

(54) ENERGY MEASUREMENT FOR A LIGHTING SYSTEM

(71) Applicant: PHILIPS LIGHTING HOLDING B.V., Eindhoven (NL)

(72) Inventors: Ashish Vijay Pandharipande, Eindhoven (NL); David Ricardo Caicedo Fernández, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/813,655

(22) Filed: Nov. 15, 2017

(65) Prior Publication Data
US 2018/0139809 A1 May 17, 2018

(30) Foreign Application Priority Data
Nov. 15, 2016 (EP) ..................................... 16198787

(51) Int. Cl.
*H05B 37/02* (2006.01)
*H05B 33/08* (2006.01)

(52) U.S. Cl.
CPC ....... *H05B 33/089* (2013.01); *H05B 33/0851* (2013.01); *H05B 37/0227* (2013.01)

(58) Field of Classification Search
CPC ............................ H05B 37/0227; G05B 15/02
See application file for complete search history.

(56) References Cited

U.S. PATENT DOCUMENTS

| | | | |
|---|---|---|---|
| 8,527,105 B1 | 9/2013 | Choong et al. | |
| 2010/0235004 A1* | 9/2010 | Thind | G05B 15/02 700/277 |
| 2011/0302125 A1 | 12/2011 | Shetty et al. | |
| 2013/0331999 A1 | 12/2013 | Vaughn et al. | |
| 2014/0175990 A1* | 6/2014 | Bhatkar | H05B 37/0245 315/154 |
| 2015/0177716 A1* | 6/2015 | Hyman | G05B 15/02 700/275 |
| 2016/0035052 A1 | 2/2016 | Tran | |
| 2016/0094088 A1* | 3/2016 | Bjorn | H02J 9/061 315/161 |
| 2016/0095188 A1* | 3/2016 | Verberkt | H05B 37/0227 315/151 |
| 2017/0027045 A1* | 1/2017 | Chemel | G05B 15/02 |
| 2017/0318647 A1* | 11/2017 | Vangeel | H04L 67/34 |

FOREIGN PATENT DOCUMENTS

EP 2838322 A1 2/2015

* cited by examiner

Primary Examiner — Jason M Crawford
(74) Attorney, Agent, or Firm — Meenakshy Chakravorty (57) ABSTRACT

An energy measurement system for a lighting system is disclosed. The lighting system may comprise multiple lighting units arranged in multiple lighting zones, multiple sensors associated with the lighting zones, and an energy measurement device. The lighting system may be arranged to switch on a lighting zone depending on at least a sensor associated with the lighting zone.
Power-on energy uses of the multiple lighting zones associated with the multiple sensors is obtained from sensor data from the multiple sensors, and energy use data from the energy measurement device, the energy use data indicating an aggregated energy use of the multiple lighting zones at different times, and a processor circuit.

13 Claims, 8 Drawing Sheets

ENERGY MEASUREMENT FOR A LIGHTING SYSTEM

FIELD OF THE INVENTION

The invention relates to an energy measurement system for a lighting system, a lighting system, an energy measurement method for a lighting system, and a computer readable medium.

BACKGROUND

The invention relates to energy measurement for a lighting system, for example a lighting system used in an office building. European patent application EP2838322 discloses a method and apparatus for energy monitoring in lighting systems. This known method requires a power calibration step in which each of the lighting devices in an area is activated sequentially. This makes it easy to find out the power use associated with a particular lighting device but has the disadvantage that an artificial power calibration phase is needed to obtain the energy use of the lights. The known method advises to perform the power calibration only occasionally and preferably at night.

A deterioration of the lighting system or a sudden condition will not be detected until the next power calibration step is carried out. In addition, this known method and apparatus have the disadvantage that energy is wasted by activating lights which are otherwise not needed, in particular if the power calibration step is carried out during the night or if the power calibration is done frequently. Furthermore, activating various lights in a building during the night may not be possible due to night uses of the building, and moreover may attract the attention of security personnel, thus causing false security alarms.

SUMMARY OF THE INVENTION

The invention aims to solve these and other problems of the prior art by providing an energy measurement system for a lighting system, the lighting system comprising multiple lighting units arranged in multiple lighting zones, multiple sensors associated with the lighting zones, and an energy measurement device, the lighting system being arranged to activate a lighting zone depending on at least a sensor associated with the lighting zone, the energy measurement system comprising:
  a first receiver arranged for receiving sensor data from the multiple sensors, the sensor data indicating states of the multiple sensors at different times,
  a second receiver arranged for receiving energy use data from the energy measurement device, the energy use data indicating an aggregated energy use of the multiple lighting zones at different times, and
  a processor circuit arranged for
    obtaining multiple pairs of a set of sensor identities and a corresponding energy use increase, said obtaining comprising:
    determining from the sensor data a switching event during which one or more sensors of the multiple sensors changed state indicating switching on one or more associated lighting zones, and determining an identity of the one or more sensors which changed state,
    determining an energy use increase associated with the switching event from the energy use data as the difference between an energy use after the switching event and an energy use on or before the switching event; and
    obtaining power-on energy uses of the multiple lighting zones associated with the multiple sensors from the multiple pairs by relating the energy use increase with a corresponding power-on energy use of the lighting zones associated with the one or more sensor identities in the sets of sensor identities.

By providing a processor circuit arranged for obtaining multiple pairs of a set of sensor identities and a corresponding energy use increase, the obtaining including determining a switching on event of lighting zones and determining one or more sensor identities associated with the switching on event, it is achieved that it can be determined which lighting zones were switched on. By configuring the processor circuit for determining an energy use increase associated with each switching event, it is possible for the processor circuit to obtain the power-on energy uses of the individual lighting zones, and thus measure the energy used by the individual power zones. A lighting zone comprises one or more lighting units that are switched on or off together. Typical examples of lighting zones are the lights in an office. Power-on energy may also be referred to as power-up energy.

Accordingly, the present invention determines the power used by lighting zones when they are normally activated when used, and does therefore not require a separate power calibration routine or power calibration step. The energy measurement according to the invention occurs may be done continuously while the system is in use, and will typically be carried out during the day, although the invention is not so limited. In addition, the energy measurement according to the invention does not require a separate and, from a user's point of view, unnecessary switching on of the lighting zones.

There is however a complication to using the normal activity of lights instead of a prearranged sequence as in the known system. It may happen that more than one lighting zone is turned on at the same, or nearly the same time. For example, turning on a lighting zone may be triggered by an occupancy sensor; in the morning as many people enter the building some of these occupancy sensors may be triggered close to each other in time, and as a result the corresponding lighting zones will be turned on close to each other in time. For example, turning on a lighting zone may be triggered by a light sensor. If ambient light is below a threshold, then the lights are turned on. However, this may happen for multiple light sensors at the same time, thus again turning on multiple lighting zones at the same time.

In the known system, this problem is solved by artificially ensuring that no lighting zones are turned on at the same time. However, in the invention as defined in the claims, the set of sensor identities includes at least one sensor identity, but may include multiple sensor identities. By relating the energy use increase with a corresponding power-on energy use of the lighting zones associated with the one or more sensor identities in the sets of sensor identities, the power-on energy use of the lighting zones can be deduced.

In an embodiment, obtaining the power-on energy uses of the multiple lighting zones comprises:
  representing the multiple pairs as multiple equations, an equation relating the one or more sensor identities to the corresponding energy use increase, wherein the power-on energy use of the lighting zones associated with the one or more sensor identities are unknowns, and
  solving the multiple equations to obtain the power-on energy uses of the lighting zones.

By using multiple equations, the relationship between the sensor identities and the power-on energy use can be readily established.

In an embodiment, the processor circuit is arranged to determine from the sensor data multiple sensors that changed state indicating activating one or more lighting zones within a time period having a duration of at most a threshold activating period, so that the switching event has a duration of at most the threshold activating period, the energy use increase associated with the switching event being determined as the difference between an energy use after the last sensor in the switching event changed state and an energy use on or before the first sensor in the switching event changed state.

By limiting the duration of a switching event, power-on events of different lighting zones can more easily be distinguished. Conversely, when multiple sensors change state within the threshold switching period, these sensor state changes will be considered to belong to the same switching event.

In an embodiment, the processor circuit may be arranged to determine from the sensor data if a sensor of the multiple sensors changed state, indicating switching off one or more associated lighting zones during the switching event, and if so to disregard the switching event. As the invention concerns determining the power-on energy use of multiple lighting zones, switching events which relate to power-off are preferably ignored. In addition, a power-off event may disturb the correct determination of a power-on energy use.

The processor circuit may further be arranged to determine if a sensor changed state in a following measurement period after the last state change of a sensor in the switching event, and if so to disregard the switching event, and/or to determine if a sensor changed state in a preceding measurement period before the first state change of a sensor in the switching event, and if so to disregard the switching event.

By determining whether sensors changed state in subsequent time periods, and to disregard a switching event if this is the case, the obtained power-on energy uses may become more accurate. Requiring a period of inactivity between sensor state changes enhances the accuracy of assigning energy use increases to specific sensor state changes and reduces the chance of pairing an incorrect energy use increase with a particular sensor state change.

At least some of the sensors may be occupancy sensors. However, other sensors may also be used, in addition to or instead of occupancy sensors. Alternative sensors may include temperature sensors, light sensors and light switches, for example. Part of the lighting system may be arranged for only producing light when there is insufficient ambient light, for example.

The processor circuit may be arranged to compute a minimum expected energy use for the switching event, and to disregard the switching event if the minimum expected energy use is below the energy use increase determined from the energy use data. This may prevent the utilization of erroneous energy use data, for example when a sensor state change indicates that a lighting zone will be activated, but that the actual activation is not carried out as other sensors indicate that there is sufficient daylight, for example. A minimum expected energy use may, for example, be 5 W per light, or 10 W per light, etc., taking the number of lights per lighting zone into account.

In a particular embodiment, the processor circuit may be arranged to subtract the determined power-on energy use of the lighting zones from a base line power-on energy use of the lighting zones, determine a lighting zone for which said subtraction exceeds a threshold, and send an alarm signal indicating said determined lighting zone.

By establishing for which lighting zone(s) the difference of the determined power-on energy use and a base line power-on energy use exceeds a threshold, it may be possible to detect errors in a lighting plan. For example, if the determined power-on energy use of a lighting zone is equal to 75 W while the base line power-on energy use is 100 W, this may indicate that a quarter of the lights of the lighting zone is no longer functioning. Conversely, if the determined power-on energy use of a lighting zone is equal to 125 W while the base line power-on energy use is 100 W, this may indicate that an installation problem. It is noted that the base line power-on energy use may be a reported power-on energy use based on a lighting plan of a building.

In an embodiment, the equations are linear equations, an equation indicating an equality between a sum of the unknown power-on energy uses of the lighting zones associated with the one or more sensor identities and the corresponding energy use increase. The multiple equations may in some embodiments be overdetermined. In the latter case, a least squares approximation may be solved by solving the corresponding normal equations. Alternatively, it is possible to multiply the system of equations, when expressed as a matrix equation, with the pseudo-inverse matrix.

The invention further provides a lighting system comprising an energy measurement system as described above, multiple lighting zones, multiple sensors associated with the lighting zones, and an energy measurement device, the lighting system being arranged to switch a lighting zone on depending on at least the sensor associated with the lighting zone, the lighting system comprising a first transmitter arranged for transmitting sensor data from the multiple sensors to the energy measurement system, the sensor data indicating a state of the multiple sensors at different times, and a second transmitter arranged for transmitting energy use data from the energy measurement device to the energy measurement system, the energy use data indicating an aggregated energy use of the multiple lighting zones at different times.

The invention further provides an energy measurement method for a lighting system, the lighting system comprising multiple lighting units arranged in multiple lighting zones, multiple sensors associated with the lighting zones, and an energy measurement device, the lighting system being arranged to switch on a lighting zone depending on at least the sensor associated with the lighting zone, the energy measurement method comprising:

receiving sensor data from the multiple sensors, the sensor data indicating states of the multiple sensors at different times, receiving energy use data from the energy measurement device, the energy use data indicating an aggregated energy use of the multiple lighting zones at different times, obtaining multiple pairs of a set of sensor identities and a corresponding energy use increase, said obtaining comprising:

determining from the sensor data a switching event when one or more sensors of the multiple sensors changed state indicating switching on one or more associated lighting zones, and determining an identity of the one or more sensors which changed state, determining an energy use increase associated with the switching event from the energy use data as the difference between an energy use after the switching event and an energy use on or before the switching event, obtaining the power-on energy uses of the multiple lighting zones associated with the multiple sensors from the multiple pairs by relating the power-on energy use of the lighting zones associated with the one or more sensor identities in the sets of sensor identities with the corresponding energy use increase.

The invention further provides a computer readable medium comprising transitory or non-transitory data representing instructions to cause a processor system to perform the method described above.

The energy measurement device is an electronic device, and can be applied in a wide range of practical applications. Such practical applications include obtaining the energy use of individual lighting zones buildings, not necessarily office buildings, ships, trains, airplanes, and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the stages of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a lighting system provided with an embodiment of an energy measurement system according to the invention, FIG. 1b schematically shows an example of an embodiment of an energy measurement system according to the invention, FIG. 2a schematically shows an example of sensor data which may be used according to the invention, FIG. 2b schematically shows an example of energy use data which may be used according to the invention, FIG. 3a schematically shows an example of a switching event as may be used in the invention, FIGS. 3b-3e schematically show an example of a disregarded switching event as may be used in the invention, FIG. 4 schematically shows an example of a lighting plan as may be used in the invention, FIG. 5a schematically shows an embodiment of an energy measurement method according to the invention, FIG. 5b schematically shows an embodiment of the energy measurement method according to the invention in more detail, FIG. 5c schematically shows an embodiment of the energy measurement method according to the invention in more detail.

LIST OF REFERENCE NUMERALS, IN FIGS. 1A-5C 10, 20, 30 a sensor that changed state
100 a lighting system
101 an energy measurement system
111, 113, 115 a sensor
112, 114, 116 a lighting zone
120 a lighting system control computer
130 an energy measuring device
140 an energy measurement system
141 a first receiver
142 a second receiver
143 a processor circuit
180 an electricity network
211-213 a sensor data
220 an energy use data
221-224 a switching on
233, 234 a switching off
241 a first receiving unit
242 a second receiving unit
250 a data analyzer
260 a solver
270 a baseline unit
275 a baseline database
310 a preceding measurement period
320 a threshold switching period
330 a following measurement period
E1, E2 an energy use
400 a lighting plan
410 a lighting unit
420 an occupancy sensor
430 a lighting zone
500 a method
505 start
510 receiving sensor data
520 receiving energy use data
530 first obtaining
531 first determining
532 first disregarding determination
533 second disregarding determination
534 third disregarding determination
535 second determining
540 second obtaining
542 representing action
544 solving action
550 subtract from baseline
560 determining zone exceeding threshold
570 send alarm signal
590 end

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

The invention provides an energy measurement system and method for a lighting system, such as an office lighting system or a home lighting system. The lighting system comprises lighting units, which may also be referred to as luminaires, arranged in multiple lighting zones. Each lighting zone may include one or more lighting units. One or more sensors are associated with each lighting zone. An energy measurement device can be associated with the multiple lighting zones. The lighting system is arranged to activate a lighting zone in response to input from a sensor associated with the particular zone and, possibly, further input. The energy measurement system is capable of determining the energy use increase caused by activating a particular lighting zone, and thus to determine the individual energy use of the activated lighting zone.

Figure 1A:
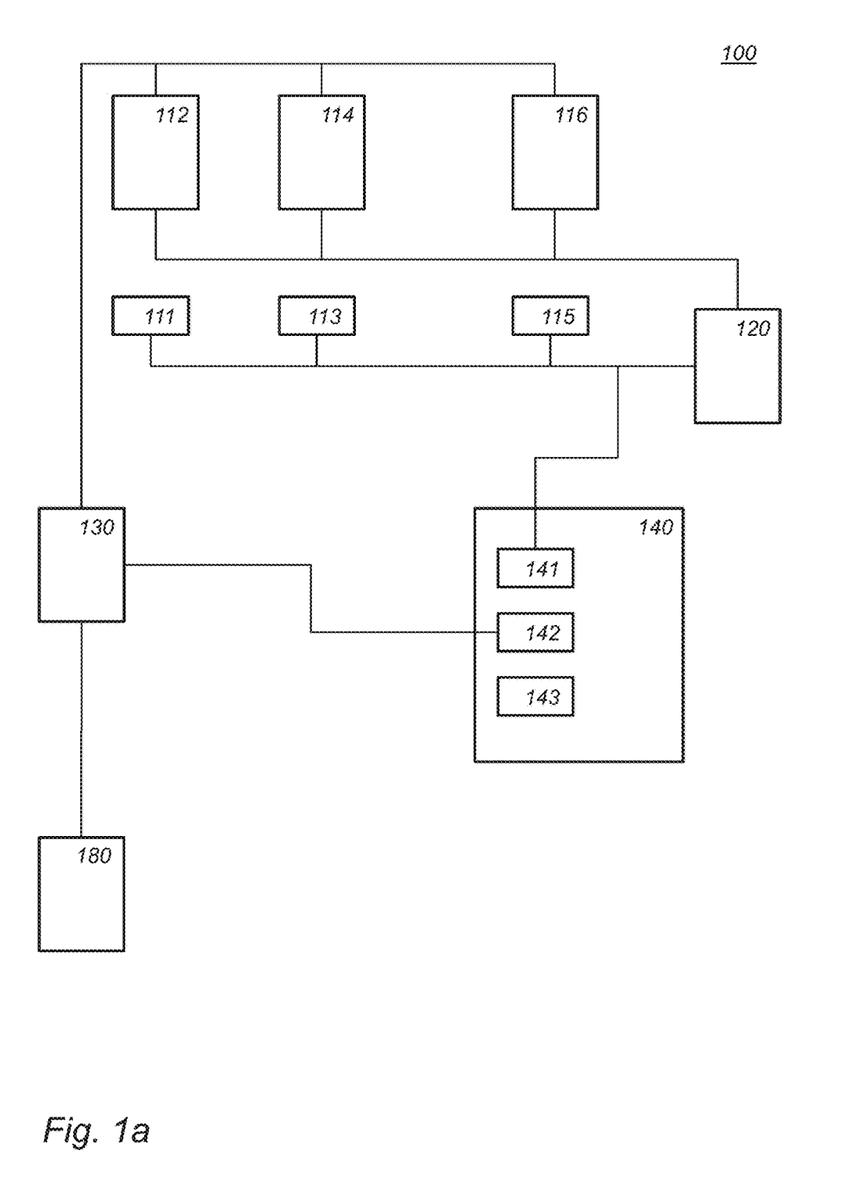

FIG. 1a schematically shows an example of an embodiment of a lighting system 100 provided with an embodiment of an energy measurement system 140 according to the invention.

The lighting system 100 includes multiple lighting zones, shown are lighting zones 112, 114 and 116. It will be understood that the lighting system may include more, or less, lighting zones. The lighting system 100 also includes multiple sensors, shown are three sensors 111, 113 and 115, each sensor being associated with a zone 112, 114 and 116 respectively. The sensors 111, 113 and 115 may be located within their associated zones, near their associated zones or spaced apart from their associated zones. It will be understood that occupancy sensors or light level sensors, for example, may be located within their associated zones, while other sensors, such as daylight sensors, may be located outside their associated zones. It will also be understood that although only a single sensor per zone is shown in FIG. 1, two or more sensors may be provided for each zone.

The sensors 111, 113 and 115 may provide sensor data as soon as an event occurs, or periodically, or both. If the sensors provide sensor data periodically, a suitable interval between transmissions of sensor data to the energy measuring system may be chosen, such as a second or a few milliseconds, for example. The sensors each have a distinct identifier which may be determined from the transmitted sensor data and/or from sensor identities data which may be transmitted separately or together with the sensor data. For example, the sensors may be arranged to communicate with the energy measurement system 140 through a computer network. The computer network may be a wireless or wired network, or a combination thereof. For example, the computer network may comprise a ZigBee network, or a WiFi network, etc.

The exemplary lighting system 100 further comprises a control computer 120 and an energy measuring device 130. The control computer 120 is connected to all lighting zones and all sensors, and is arranged to switch lighting zones on and off in response to sensor data produced by the sensors, and possibly also in response to other data, such as data produced by a timer or by a manual switch. It is a problem that often the lighting control computer does not provide detailed switching details of the various lighting units. For example, lighting control computer 120 and energy measurement system 140 may be from different manufacturers. It may not be possible to obtain individual switching information if control computer 120 uses proprietary technology. On the other hand, the sensor information may be available, for example, energy measurement system 140 could listen in directly on the sensor communication.

A lighting network may also work with decentralized control, e.g., with rules that are stored locally in the lighting units. Without a central computer 120, a lighting unit could receive over the computer network that connects that lighting units and sensors that the sensors detected an event, e.g., an occupation, a light level, etc. In this case the lighting units have stored rules that determine when they switch on, e.g., in response to a sensor detecting occupation, a light sensor detecting a light level below a threshold, or when to switch off, e.g., in response to a sensor detecting lack of occupation, or a (daylight) light level above a threshold. In this case, switching information simply is not available at a central location, even though sensor information can be obtained by receiving the same sensors messages destined for the lighting units, over the same computer network.

The energy measuring device 130 may be constituted by a wattmeter or similar device for measuring electric power. Alternatively, the energy measuring device 130 may be implemented using a current and voltage meter. The energy measuring device 130 is connected to an electric power source, such as the public electricity network 180 or a generator, to receive electric power. Energy measuring device 130 measures power aggregated over multiple lighting zones. A lighting zone is a set of one or more lighting units that are switched on and off together. For example, the lighting units in a set have the same rules that determine how they respond to sensor information, so that make the same switching decision, or receive the same switching decisions from a central control computer, like control computer 120.

It is preferred that the energy measuring device 130 is arranged for repeatedly providing energy use data, for example periodically or each time when a change in energy use occurs. Periodically providing energy use data may include providing energy use data using a suitable time interval, such as every second or every few milliseconds, for example. The repeatedly provided energy use data can indicate an aggregated energy use of the multiple lighting zones at different times.

Energy measurement device 130 provides information about the aggregated energy use of multiple lighting zones. For example, energy measurement device 130 may measure the energy use of an entire building, or an entire floor, etc. However, there is a desire to have more fine grained energy measurement data available. In particular, energy use per lighting zone would be desired. For example, such data would show which lighting zones operate out of specification. For example, such a lighting zone may be configured incorrectly or comprise malfunctioning lighting units. Such a lighting zone may need to be repaired. Furthermore, the individualized data helps to attain environmental targets, e.g., in energy consumptions. The individualized data shows which lighting units use a large amount of energy.

Particularly, the power-on energy use of a lighting zone is interesting. The power-on energy use, e.g., the energy consumed immediately after powering-up a lighting zone. The power-on energy use is closest to the normal energy use of the unit, e.g., its energy rating, or specified energy use. After power-on of a lighting zone, the lighting units may be dimmed, e.g., based on time of day, or on the amount of ambient light. Knowing the power-on use, it is clear where different rated lighting units are installed, e.g., where 40 Watt lighting units are installed, even though there ought to be 10 Watt lighting units, e.g., according to a lighting plan.

The energy measuring system 140 includes, in accordance with the invention, a first receiver 141, a second receiver 142 and a processor circuit 143. The energy measuring system 140 may include further components which are not shown in FIG. 1 for the sake of clarity of the illustration. The first receiver 141 is arranged for receiving sensor data from the sensors 111, 113 and 115, and possibly also from the control computer 120, while the second receiver 142 is arranged for receiving energy use data from the energy measuring device 130. As the energy measuring device 130 is, in the present example, arranged for measuring the electric energy consumed by all lighting zones, the energy use data produced by the energy measuring device 130 and received by the second receiver 142 therefore indicate an aggregate energy use of the multiple lighting zones at different times. It will be understood that the first receiver 141 and the second receiver 142 may be combined into a single receiver arranged for receiving both sensor data and energy use data. For example, the first and/or second receiver may be a computer network interface arranged to receive computer network messages from both the sensors in the lighting system 100, as well as energy use messages from energy measurement device 130.

The processor circuit 143 is arranged to obtain pairs of data, each pair including a set of sensor identities and a corresponding energy use increase. Each sensor identity and each energy use increase can include a time stamp or be associated with a time indication representing the time at which a sensor changed state and the time at which an energy use increased respectively.

The processor circuit 140 is further arranged to obtain these pairs of data by determining from the sensor data which of the lighting zones was activated, that is, in which lighting zone the lights were switched on, and by determining the identity of the sensor or sensors which changed state, either to cause the activation of the lighting zone, or as a result of the activation. Using the difference between the energy use after the switching event and the energy use on or before the switching event, the processor circuit 143 determines the energy use increase associated with the switching event.

Thus, the processor circuit 140 is capable of obtaining the power-on energy uses of the multiple lighting zones associated with the multiple sensors from the multiple pairs, in particular by relating the energy use increase with the corresponding power-on energy use of the lighting zones identified by the sensor identities.

Figure 1B:
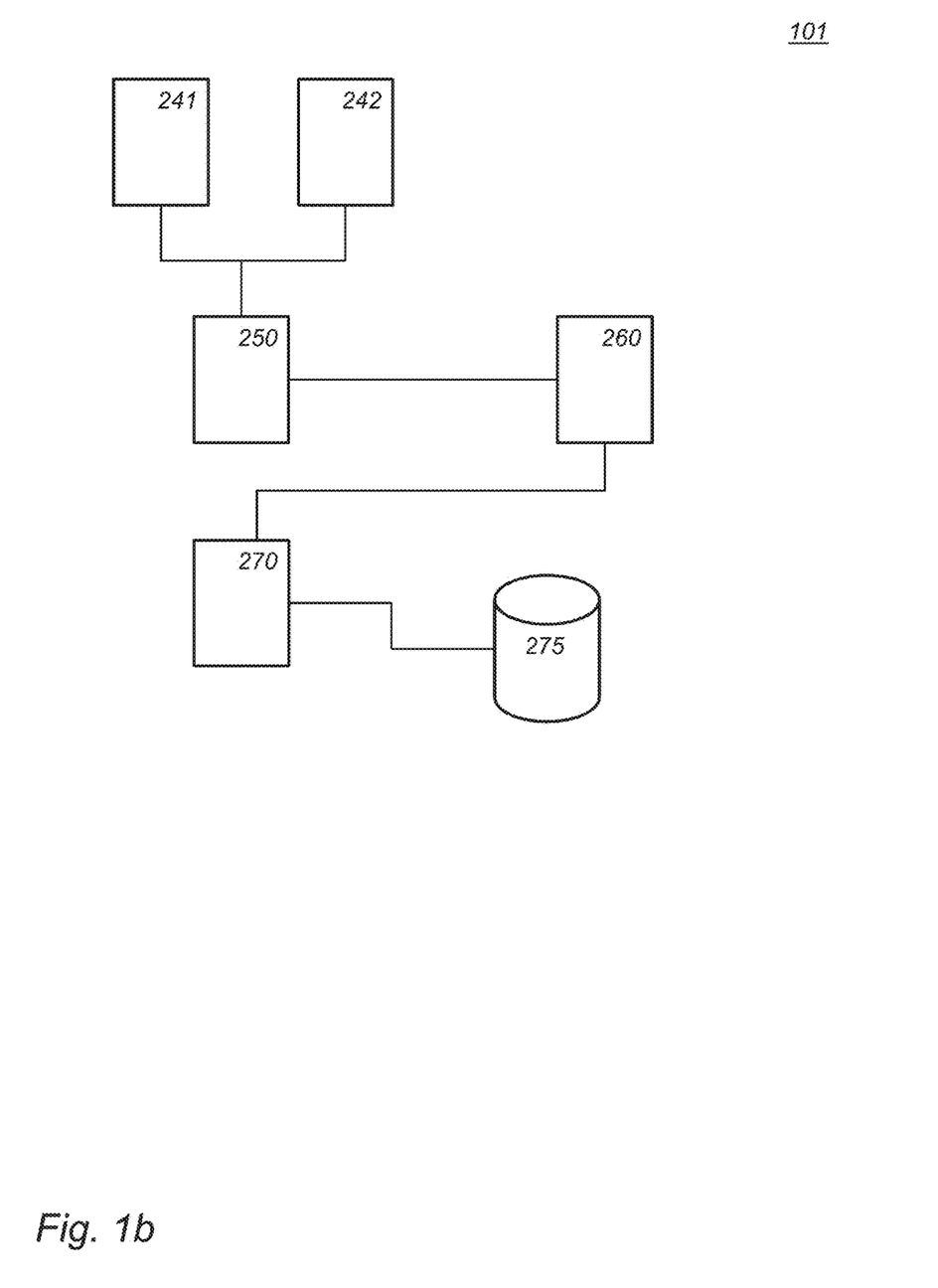

FIG. 1*b* schematically shows an example of an embodiment of an energy measurement system 101 according to the invention. FIG. 1*b* represents a possible architecture of energy measurement system 101, e.g., as functional units, in a software based implementation, or as circuits in a hardware based systems, or as a combination thereof in a hybrid software/circuit implementation.

Energy measurement system 101 comprises a first receiving unit 241 and a second receiving unit 242. First receiving unit 241 is arranged for receiving sensor data from multiple sensors, e.g. sensors 111-115. The sensor data indicates states of the multiple sensors at different times. Second receiving unit 242 is arranged for receiving energy use data from an energy measurement device, e.g., energy measurement device 130. The energy use data indicating an aggregated energy use of the multiple lighting zones at different times.

Energy measurement system 101 comprises a data analyzer 250. Data analyzer 250 is arranged to obtain from the sensor data and the energy use data multiple pairs of a set of sensor identities and a corresponding energy use increase. For example, data analyzer 250 may be arranged to determining from the sensor data a switching event (221-224) during which one or more sensors of the multiple sensors changed state indicating switching on one or more associated lighting zones, and determining an identity of the one or more sensors which changed state; For example, the sensors may send their identity along with the data. A database, e.g., a table, may contain a mapping between sensor identity and lighting zone identity. Alternatively, sensor identity may be directly used to represent the corresponding lighting zone.

determining an energy use increase associated with the switching event from the energy use data as the difference between an energy use after the switching event and an energy use on or before the switching event.

Data analyzer thus produces a list of pairs, in which lighting zones and their aggravated energy use are represented. If it were the case that each pair contained only one lighting zone, then obtaining individualized energy use of the various lighting zones would be easy. However, in general one or more of the sets in the pairs will contain more than one lighting zone. In this case, the individualized energy use cannot directly be read off the list of pairs.

Energy measurement system 101 comprises a solver 260. Solver 260 is arranged to obtain power-on energy uses of the multiple lighting zones associated with the multiple sensors from the multiple pairs by relating the energy use increase with a corresponding power-on energy use of the lighting zones associated with the one or more sensor identities in the sets of sensor identities. An advantageous way to achieve this is to arrange solve 260 to representing the multiple pairs as multiple equations, an equation relating the one or more sensor identities to the corresponding energy use increase, wherein the power-on energy use of the lighting zones associated with the one or more sensor identities are unknowns, and solving the multiple equations to obtain the power-on energy uses of the lighting zones.

An example, of using equations to obtain the individualized energy use is given below. Using equations and solving them is a convenient way to obtain the energy use of the lighting zones, but is not necessary. For example, solver 260 may be arranged with patterns. For example, for each set that contains only one lighting zone, solver 260 may obtain the energy use of the lighting zone. This information may then be substituted in the other pairs, to eliminate this lighting zone there from. If some pairs now only have a single lighting zone, then these may be obtained, etc. More advanced patterns are possible, for example, the solver 260 may be arranged to locate three pairs, which contain the energy use of 3 lighting zones a, b, and c; Such that the first pair has the energy use of a and b, the second of b and c, the third of a and c. By adding the energy use of the first two pairs, subtracting the energy use of the third pair, and dividing by two, the energy use of b is obtained. Other patterns are possible.

In an embodiment, the equations are linear equations. This is convenient and sufficiently accurate; however, it is possible to fit a non-linear model of energy use to the observed data as well. Solving linear equations may be done in a number of ways, e.g., using Gaussian elimination. The system of equations obtained from the pairs may be under determined, in which case solver 260 may only be able to obtain the energy use for some zones, or possibly none at all. The system may also be overdetermined. This is both preferred, and more likely to occur if the data is obtained from regular use of the lighting system. In this case, we can solve the least square approximation by solving the corresponding normal equations. We could also multiply the system of equations when expressed as matrix equation with the pseudo-inverse.

A result of the solver 260 is that for each lighting zone, or at least for some lighting zones the energy use or at least the power-on energy use is known. This information may be used in various ways. For example, Energy measurement system 101 may comprises an optional a baseline unit 270, and a baseline database 275. Baseline database 275 may also be external to energy measurement device 240. Baseline database 275 stores one or more baselines, e.g., energy use of lighting zones, e.g., in the past, or as expected.

For example, baseline unit 270 may be arranged to subtract the determined power-on energy use of the lighting zones from a base line power-on energy use of the lighting zones. The subtraction may indicate a broken or deteriorating lighting zone, if the new measurement is lower than the base line measurement. The subtraction may indicate an installation problem if the new measurement is higher than a base line (e.g., an expected) energy use.

For example, the base line energy use may be obtained from a baseline database 275. For example, baseline database 275 may be table. The baseline could be the reported energy use according to a building lighting plan. In this case, the deviations between the two indicate errors in the implementation of the light plan, e.g., locations where a wrong light was installed, or locations were a mal-configuration causes an increased or decreased energy use. Deviations between lighting plan and reality happen relatively frequently, especially after reorganizations in an office building.

The baseline may also be the energy use of the same lighting zone some time ago, e.g., a month ago. In this case deviations indicate lighting units that have a problem, e.g., one of the lighting units in a lighting zone may have broken down or have deteriorated. For example, if the energy use of a lighting zone has dropped from 100 Watt to 75 Watt, one of the lighting units is likely broken.

For example, baseline unit 270 may be arranged to determine a lighting zone for which said subtraction exceeds a threshold. For example, the deviation may be positive or negative. Baseline unit 270 may send an alarm signal indicating said determined lighting zone. For example, baseline unit 270 may send a report, e.g., an email, or an sms, etc.

Figure 2A:
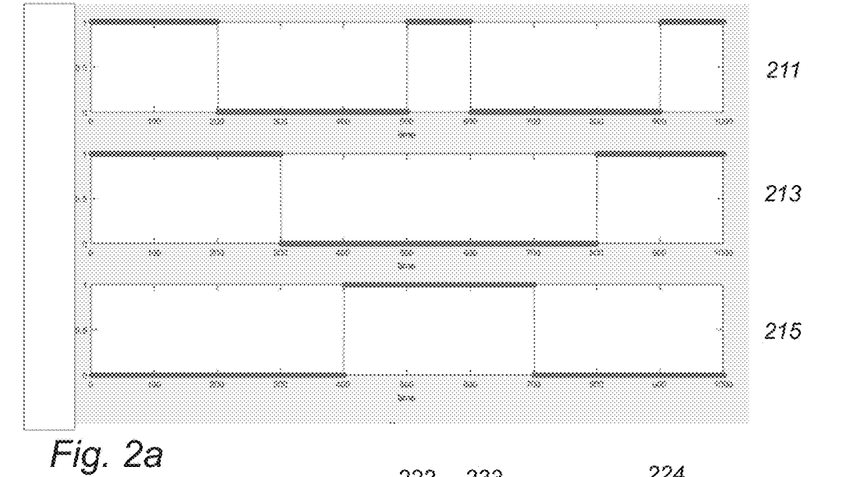

FIG. 2a schematically shows an example of sensor data which may be used according to the invention. FIG. 2a shows sensor data as a function of time (the unit of time for example being a second). The sensor data 211, 213 and 215 can be provided by the sensors 111, 113 and 115 respectively and may, for example, represent occupancy states of the associated lighting zones 112, 114 and 116 respectively. The sensor data 211, 213 and 215 are samples provided at a suitable sampling rate, e.g., at 1 sample per second. As can be seen in FIG. 2a, the sensor data 211 are equal to "1" from time=0 to time=200 (for example seconds), indicating that the first lighting zone 112 is occupied during this time period. Then the sensor data 211 are equal to "0" from time=200 to time=500, indicating that the first lighting zone 112 is not occupied during this time period, for example. Note that the first sensor 111 changed state at time=200 by changing from an activated stated during which the first sensor 111 detected that the lighting zone 112 was occupied to a deactivated state during which the first sensor detected that the lighting zone 112 was no longer occupied.

Similarly, the sensor data 211 are shown to change at time=500 from a deactivated state in which the sensor data 211 are equal to "0" to an activated state in which the sensor data 211 are equal to "1". This switching event, in which the state of the sensor changes from deactivated into activated, is used in the present invention to identify energy use increases, as will later be explained in more detail.

At time=600, the sensor data 211 again change from "1" to "0", indicating that the sensor 111 is deactivated. At time=900, the sensor data 211 again change from "0" to "1", thus reflecting the reactivation of the sensor 111 and a switching on of the corresponding lighting zone 112.

The sensor data 213 indicate a deactivation of the corresponding sensor 113 at time=300 and a reactivation at time=800, while the sensor data 215 indicate an activation at time=400 and a deactivation at time=700 of the corresponding sensor 115.

Figure 2B:
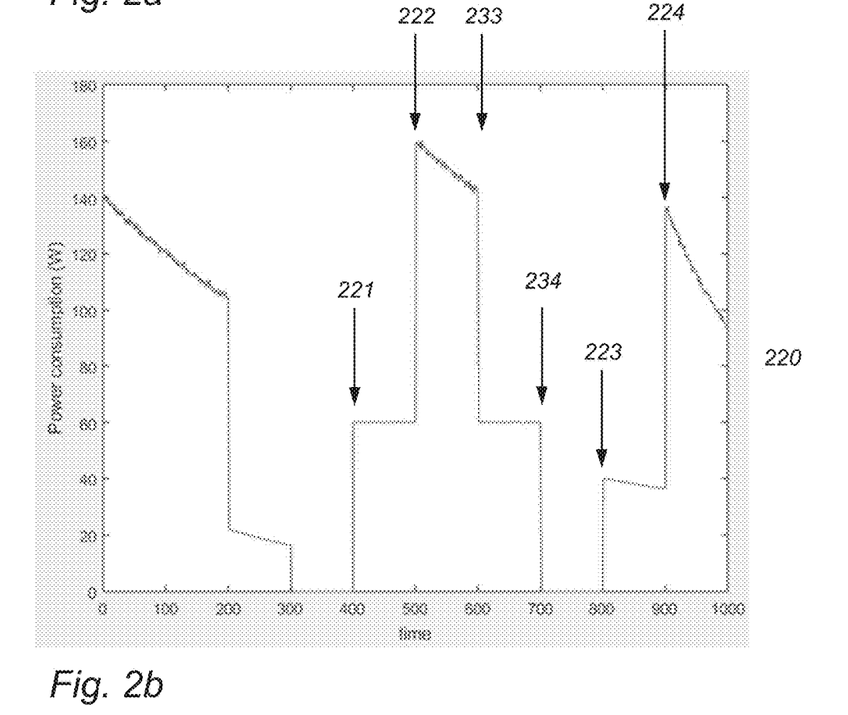

FIG. 2b schematically shows an example of energy use data which may be used according to the invention. FIG. 2b shows the energy use as a function of time, for example, the same unit of time used in FIG. 2a. The energy use data schematically shown in FIG. 2b indicate the aggregate energy use of the lighting zones 112, 114 and 116 of FIG. 1, as measured by the energy measuring device 130. FIG. 2b corresponds to the same situation as FIG. 2a. The energy use data 220 are provided by the energy measuring device 130 and received by the second receiver 142 in FIG. 1. FIG. 2b also shows energy use increases 221, 222, 223 and 224 which are caused by the activation (that is, switching on) of lighting zones.

Comparing FIGS. 2a and 2b, it can be seen that the sensor data 211, 213 and 215 are all equal to "0" between time=300 and time=400, which corresponds to an energy use equal to zero. At time=400, the energy use increases from 0 to 60 W, as shown in FIG. 2b. This energy use increase 221 corresponds with the activation of the sensor 115, as indicated by the sensor data 215, and a switching on of the corresponding lighting zone 116. At time=500, an energy use increase 222 raises the total energy use from 60 W to approximately 160 W. Similarly, an energy use increase 223 raises the energy use from zero to 40 W at time=800 and is caused by lighting zone 114 being switched on, as indicated by the sensor data 213. An energy use increase 224 from approximately 40 W to 140 W at time=900 reflects the switching on of lighting zone 116, as indicated by sensor data 211.

It can thus be seen that using the sensor data, each energy use increase can be paired with a switching events at a lighting zone. The detected energy use increase can then be used as an estimate of the energy use of the particular lighting zone. If two energy use increases of the same lighting zone are detected, such as the energy use increases 222 and 224 which both relate to the first lighting zone 112 (see sensor data 211 in FIG. 2*a*), then the energy use increases may be averaged to provide a better estimate of the energy use of the lighting zone concerned. If a system of equations is used to obtain the individual energy uses of lighting zones, then adding both the energy increase at event 222 and at event 224 will lead to an over-determined system of equations (assuming the other lighting zones are also represented in the set of equations). Solving this set of equations will automatically find a value for lighting zone 112 that fits the observed data, e.g., by finding a least squares fit. This solution for lighting zone 112 may in fact be the average of energy increases 222 and 224, e.g., if no other information on lighting zone 112 is available.

It is noted that the present invention preferably uses the energy use increases (that is, switching on events) rather than the energy use decreases (switching off events). Although it is possible to use energy use decreases, such as 233 and 234, instead of or in addition to energy use increases, it has been found that energy use decreases (that is, switching off events) are less reliable indicators of the actual energy use than energy use increases. In FIG. 2*b*, it can be seen that the aggregated energy use gradually decreases between time=500 (switching on event 222) and time=600 (switching off event 233). This gradual decrease (as opposed to sudden decreases relating to switching off events) may be due to dimming the light units during use, characteristics of the light units used (for example light units having a relatively high positive temperature coefficient), and/or other factors. As a result, the energy use at a switching off event does not always provide a reliable estimate of the average energy use of a lighting zone, and even less of the maximum energy use of a lighting zone.

In an embodiment, both switching on and switching off events are taken into account. In this case a measurement period 310 and 330, as explained below, may still be used. By taking both switching on and switching off events into account an estimate of the actual energy use is obtained. For example, if the energy use is linear in time as is approximately the case in FIG. 2*b*, the average of the energy consumption at power-on and power-off gives an indication of the average. For example, the average of the energy difference at 222 and 233.

It is further noted that the energy use increase 222 which occurs around time=500, for example, may be determined by calculating the average power consumption of time=499 and time=501, for example. Instead of time 499, and 501 other times may be selected, e.g., which are further removed from switching event 500. Instead of time points the energy use may also be computed in a measurement period, e.g., from 490-495 and from 505 to 510.

Figure 3A:
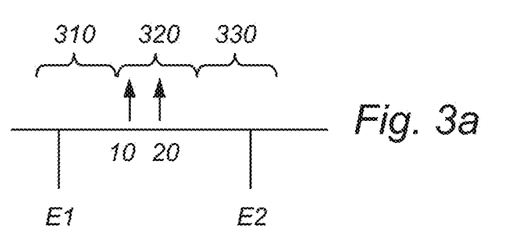

FIGS. 3*a*-3*e* schematically illustrate the switching on (upward arrow) and switching off (downward arrow) of lighting zones as a function of time, as represented by sensor state changes. In FIG. 3*a*, sensor state changes 10 and 20 occur within a threshold switching period 320. E1 is the first sensor in the switching event that changed state, while E2 is the second sensor in the switching event that changed state. E1 occurs in a measurement period 310 preceding the threshold switching period 320, while E2 occurs in a measurement period 330 following the threshold switching period 320.

According to the invention, a processor can be arranged to determine, from the sensor data, multiple sensors that changed state, such as the sensor state changes 10 and 20 in FIG. 3*a*. These sensor state changes 10 and 20 indicate an activation of one or more lighting zones and occur within a threshold activating period 320. As a result, the switching event has a duration of at most the threshold activating period. The energy use increase associated with the switching event is determined as the difference between an energy use after the last sensor in the switching event changed state, as indicated by E2, and an energy use on or before the first sensor in the switching event changed state, as indicated by E1 in FIG. 3*a*. E2 may be taken at the end of period 330, and E1 may be taken at the end of period 310 but before 320. Instead of point in time, period around E1 and E2 may be used.

In FIG. 3*a*, the switching events 10 and 20 occur in the threshold switching period 320, while no switching events occurred in the preceding measurement period 310 or the following measurement period 330. The difference in energy use measured at E2 and E1 (e.g., E2−E1), represents the power-on energy use of the lighting zones associated with sensors 10 and 20.

The processor circuit may be arranged to determine from the sensor data if a sensor of the multiple sensors changed state indicating switching off one or more associated lighting zones during the switching event, and if so to disregard the switching event. More in particular, the processor circuit may be arranged to determine if a sensor changed state in a following measurement period after the last state change of a sensor in the switching event, and if so to disregard the switching event, and/or determine if a sensor changed state in a preceding measurement period before the first state change of a sensor in the switching event, and if so to disregard the switching event.

In this case, the energy difference between E2 and E1 represents the aggravated power-on energy use of the lighting zones associated with switching events 10 and 20. In this case, an equation can be defined that represents this, e.g., that the power up energy use of lighting zones associated with switching events 10 and 20 equals the energy use difference between E2 and E1.

Figure 3B:
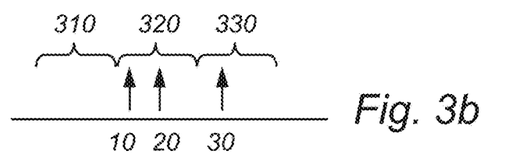

A first example of a disregarded switching event is illustrated in FIG. 3*b*, where a third sensor state change 30 occurs after the threshold switching period 320, namely, in the following measuring period 330. As the third sensor stage change 30 occurs in the following measuring period, this switching event in disregarded. This is done to make it easier to link a certain energy increase with a certain switching event. Some time may be needed for the new energy use measurement to become accurate, or to be picked up the system (for example, if the energy measurements are less frequent than the sensor changes). By demanding a period of rest after the last sensor change we are surer that energy use increase we see is fully attributable to the sensor changes that are observed.

Figure 3C:
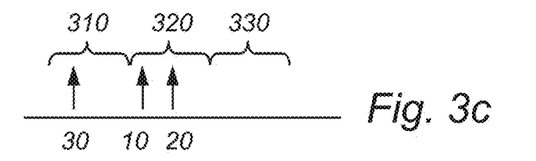

A second example of a disregarded switching event is illustrated in FIG. 3*c*, where a third switching event 30 occurs in a preceding measurement period 310. As a result, the entire switching event is disregarded. An energy measurement taken in period 310 may or may not take the switching event 30 into account. Moreover, switching itself may cause brief peaks on the network that are to be ignored.

Figure 3D:
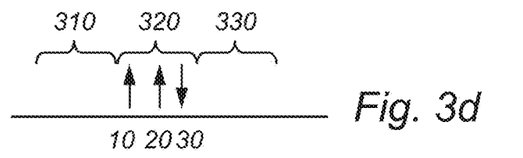

A third example of a disregarded switching event is illustrated in FIG. 3*d*, where a third switching event 30 occurs within the threshold switching period. However, as the third switching event 30 is a deactivation (switching off) rather than an activation (switching on), the entire switching event (including sensor state changes 10 and 20) is disregarded. In an embodiment, it is preferred to obtain the power-on energy use, as this best approximates the energy rating of the lighting zones.

Figure 3E:
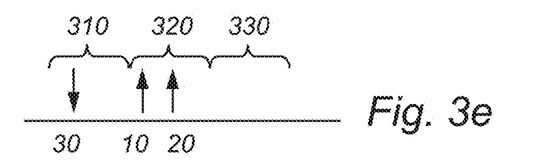

A fourth example of a disregarded switching event is illustrated in FIG. 3e, where a third switching event/sensor state change 30 occurs in the preceding measurement period. In addition, the third event in a deactivation, so the event is disregarded for two reasons.

For example, processor circuit 143 may select a switching period 320 as follows.

Wait until a first measurement period 310 has elapsed, in which no switching events took place.

Wait until the first switching event. If it is a switching off event, go back to stage 1.

Determine all switching events in a switching period 320, starting with the first switching event in stage 2. If a switching event is a switching off, go back to stage 1.

Starting from the last switching even in the switching period 320, wait a second measurement period 330. If a switching event takes place go back to stage 1.

Record the lighting zones that switched on during the switching period, together with the difference of an energy use in measurement period 310 and measurement period 320.

Energy measurement system 140 may also disregard a switching event if it is unlikely according to a likelihood rule that the switching event corresponds to a real switching event.

Lighting systems can have rather large rule sets with many sensors of different types. It is possible that a sensor could indicate that lights should turn on, but for some reasons they may not (e.g., occupancy is detected but ambient light is bright enough) or for because the lights were already on (e.g., a user used a command interface to override the normal response of the system).

In an embodiment, the system may assume a minimum energy use of say 5 Watt per light (or more if appropriate). In some lighting systems, the lowest light used is 10 w. This could also use knowledge about the number of lamps in a lighting zone. The advantage is that accuracy may increase. A disadvantage is that broken lamps may not be detected anymore.

In an embodiment, the processor circuit is arranged to compute a minimum expected energy use for the switching event, and to disregard the switching event if the minimum expected energy use is below the energy use increase determined from the energy use data.

The lengths of the measurement and switching periods may be determined depending on the speed of the energy measurement device and the lighting system, e.g., how fast the energy measurement device will give an accurate reading after a switching event. For example, these periods may each be a few seconds.

Figure 4:
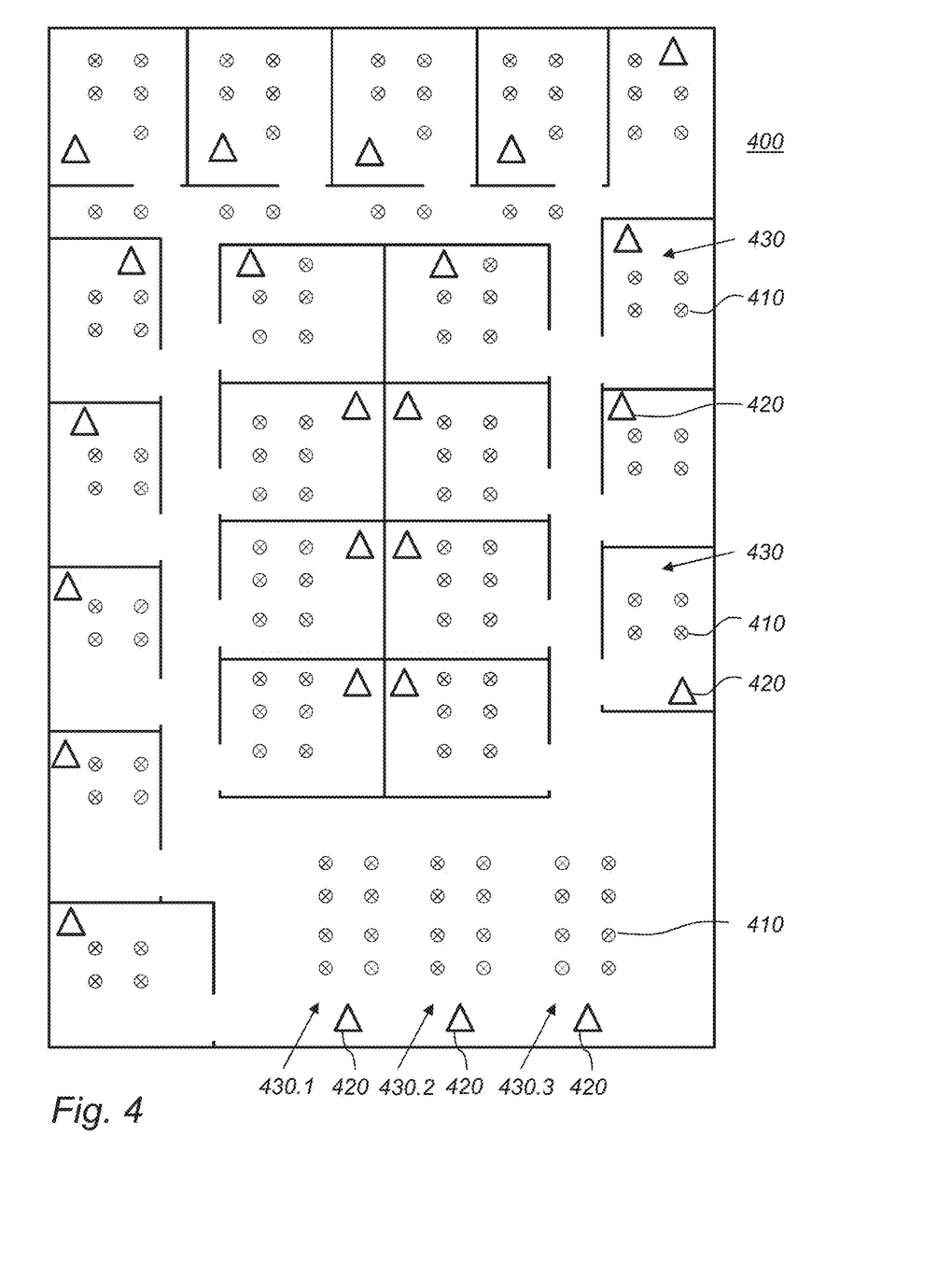

FIG. 4 schematically shows an example of a lighting plan as may be used in the invention. The lighting plan 400, which can be the lighting plan of an office, includes multiple lighting zones 430, while each lighting zone includes multiple lighting units 410. A sensor 420, which can be an occupancy sensor, is shown to be arranged in or near each lighting zone 430. The boundaries of some lighting zones are defined by walls, while the boundaries of lighting zones 430.1, 430.2 and 430.3 are not defined by walls.

In the exemplary lighting plan 400, the lighting units 410 of a lighting zone are switched on, switched off and optionally dimmed collectively. Multiple lighting zones may be switched on or off together, or may be dimmed together.

Note that it may happen that a sensor seems to indicate a switching event, even though in reality none did occur. For example, an occupancy sensor may detect presence in a room, but it may be that at the same time the switching on was overruled with a wall switch. In this case, it may happen that inaccurate data is used; however, if sufficient data is available this will average out.

In the various embodiments, the input interface may be selected from various alternatives. For example, input interface may be a network interface to a local or wide area network, e.g., the Internet, or a proprietary interface etc.

Typically, the devices 120, 140 and 101 each comprise a microprocessor (not separately shown) which executes appropriate software stored at the device 120, 140 and 101; for example, that software may have been downloaded and/or stored in a corresponding memory, e.g., a volatile memory such as RAM or a non-volatile memory such as Flash (not separately shown). The devices 112-116, 111-115, and 130 may also be equipped with microprocessors and memories (not separately shown). Alternatively, the devices 120, 140 and 101 may, in whole or in part, be implemented in programmable logic, e.g., as field-programmable gate array (FPGA). Devices 120, 140 and 101 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, device 140 and/or 101 comprises a first receiving circuit, a second receiving circuit, a data analyzer circuit, a solver circuit, a baseline unit circuit, and a baseline database circuit. The circuits implement the corresponding units described herein. The circuits may be a processor circuit and storage circuit, the processor circuit executing instructions represented electronically in the storage circuits. The circuits may also be, FPGA, ASIC or the like.

Figure 5A:
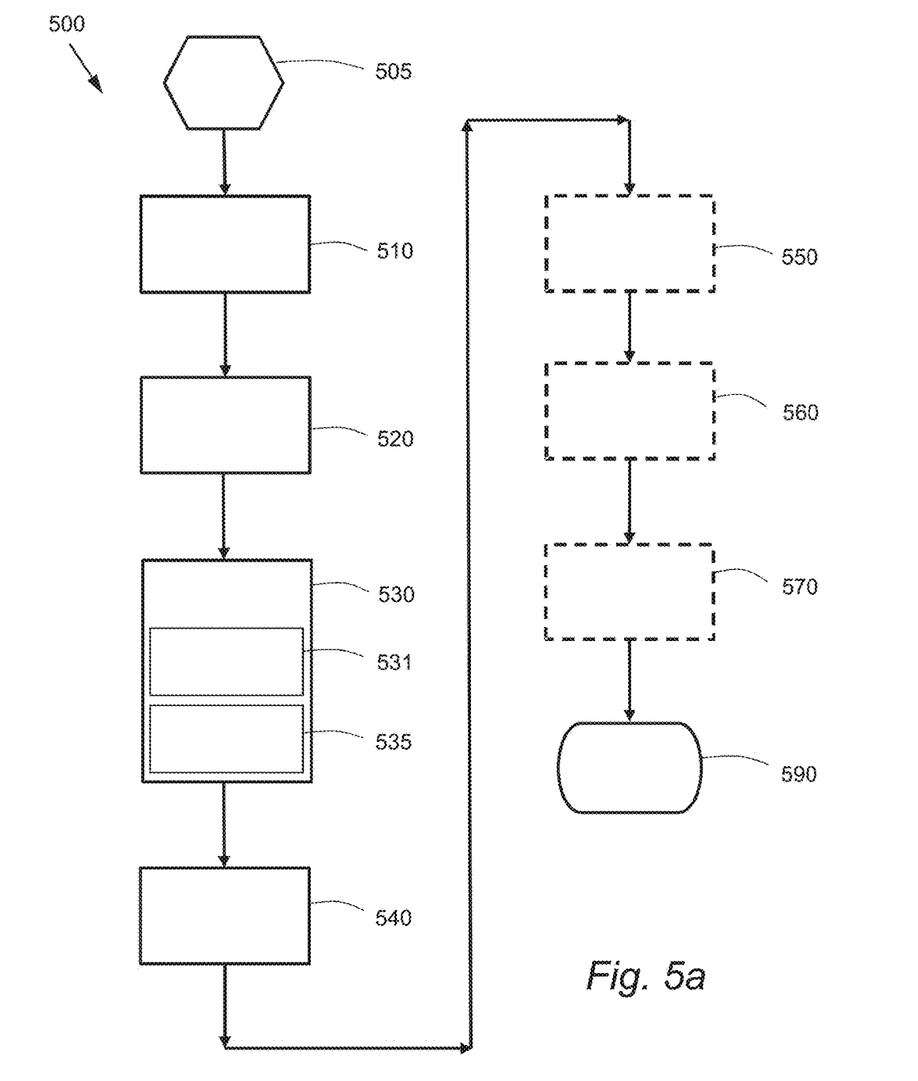

FIG. 5a schematically shows an embodiment of an energy measurement method according to the invention. This embodiment may be used in a lighting system arranged to switch on a lighting zone depending on at least one sensor associated with a particular lighting zone.

The method 500 illustrated in FIG. 5a includes a first or start action 505 in which the method is initiated, followed by a receiving action 510 which includes receiving sensor data from the multiple sensors (111, 113 and 115 in FIG. 1a), the sensor data indicating states of the multiple sensors at different times. A further receiving action 520 includes receiving energy use data from the energy measurement device (130 in FIG. 1a), the energy use data indicating an aggregated energy use of the multiple lighting zones at different times.

A first obtaining action 530 includes obtaining multiple pairs of a set of sensor identities and a corresponding energy use increase. The first obtaining action 530 includes sub-actions:

a first determining action 531 which includes determining from the sensor data a switching event (221-224 in FIG. 2b) when one or more sensors of the multiple sensors changed state indicating switching on one or more associated lighting zones, and determining an identity of the one or more sensors which changed state, and a second determining action 535 which includes determining an energy use increase associated with the switching event from the energy use data as the difference between an energy use after the switching event and an energy use on or before the switching event.

A second obtaining action 540 includes obtaining the power-on energy uses of the multiple lighting zones associated with the multiple sensors from the multiple pairs by relating the power-on energy use of the lighting zones associated with the one or more sensor identities in the sets of sensor identities with the corresponding energy use increase.

The method 500 may then conclude with end action 590. However, embodiments of the method 500 may include further actions, which are shown with dashed lines in FIG. 5a. The optional further actions of method 500 may include:
- a subtracting action 550 to subtract the determined power-on energy use $x_1$ of the lighting zones from a base line power-on energy use $x_2$ of the lighting zones,
- a determining action 560 to determine a lighting zone for which said subtraction exceeds a threshold ($x_1-x_2>D$; $x_2-x_1>D$), and
- a sending action 570 to send an alarm signal indicating said determined lighting zone.

The base line power-on energy use may be the reported energy use according to a building lighting plan. Alternatively, or additionally, the base line power-on energy use may be determined in the past using the present invention. When the base line energy use is based upon a building plan, errors in the lighting plan associated with the building plan may be detected using the actions 550-570 outlined above. When the base line energy use is determined using the present invention, defective or deteriorating lighting zones may be detected by using the present invention again.

Figure 5B:
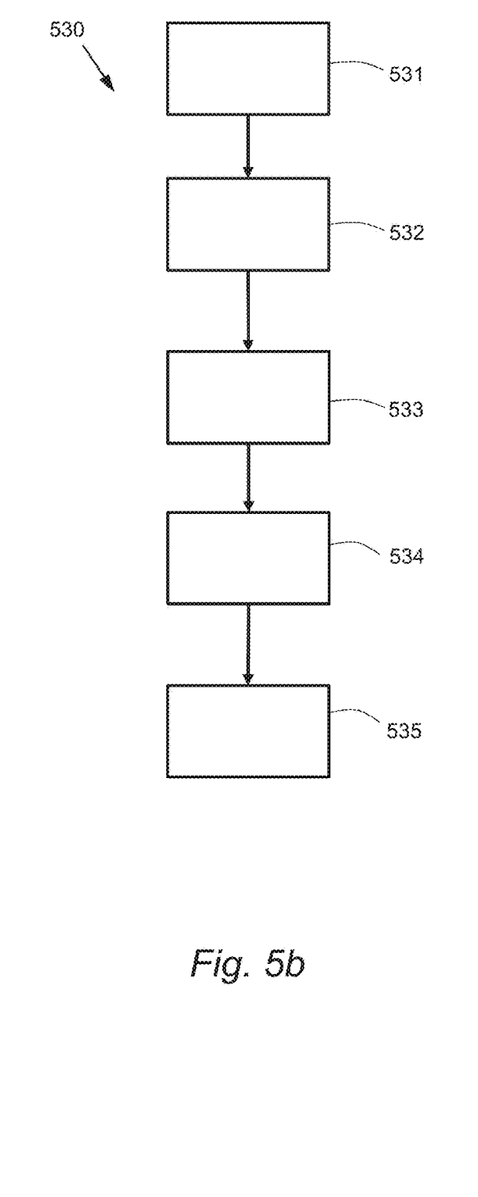

FIG. 5b schematically shows an embodiment of the energy measurement method according to the invention in more detail. FIG. 5b schematically illustrates that the first obtaining action 530 may additionally include:
- a determining action 532 to determine from the sensor data if a sensor of the multiple sensors changed state indicating switching off of one or more associated lighting zones during the switching event, and if so to disregard the switching event,
- a determining action 533 to determine if a sensor changed state in a following measurement period (330 in FIGS. 3a-3e) after the last state change of a sensor in the switching event, and if so to disregard the switching event, and/or
- a determining action 534 to determine if a sensor changed state in a preceding measurement period (310 in FIGS. 3a-3e) before the first state change of a sensor in the switching event, and if so to disregard the switching event.

Figure 5C:
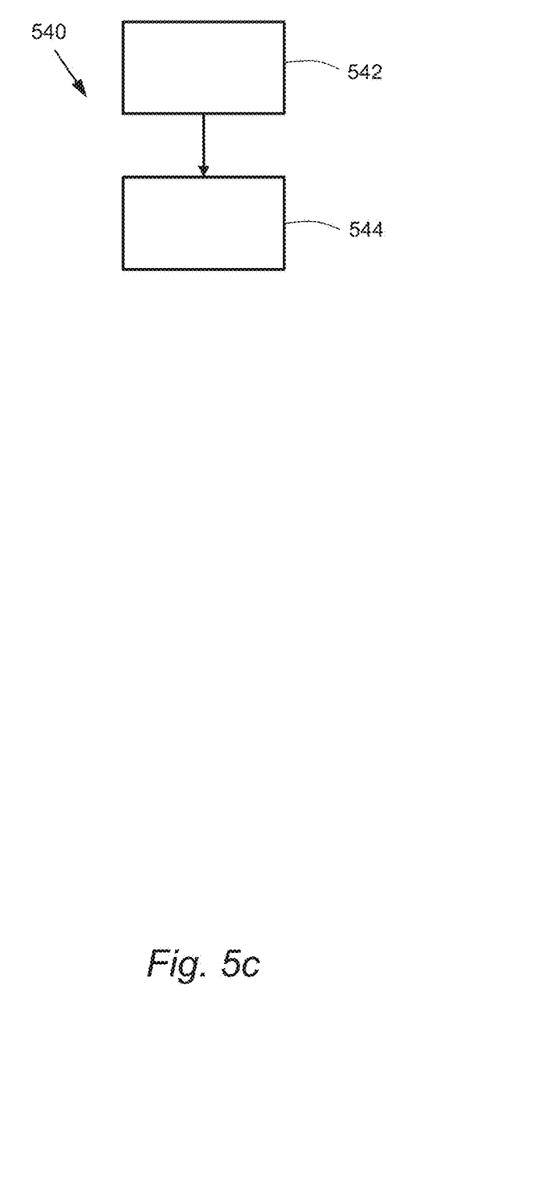

FIG. 5c schematically shows an embodiment of the energy measurement method according to the invention in more detail. FIG. 5c schematically illustrates that the second obtaining action 540 may additionally include:
- a representing action 542 to represent the multiple pairs as multiple equations, an equation relating the one or more sensor identities to the corresponding energy use increase, wherein the power-on energy use of the lighting zones associated with the one or more sensor identities are unknowns, and
- a solving action 544 to solve the multiple equations to obtain the power-on energy use of the lighting zones.

Below a worked example is given. Suppose energy measurement system 140 identified five switching events for five lighting zones. We will refer to the lighting zones with the indices 1 to 5. The as of yet unknown power-on energy use of the lighting zones are indicated as $x_1, \ldots, x_5$. In the first switching event, the lighting zones 1 and 2 are switched on soon after each other, and an energy use increase of 95 was measured, e.g., 95 W. This may be represented by the equation $x_1+x_2=95$. The other four switching events in this example are: $x_2+x_3=115$, $x_1+x_4=130$, $x_3+x_4+x_5=210$, and $x_3+x_5=100$. These equations may be represented as a matrix equation as follows:

$$\begin{bmatrix} 1 & 1 & 0 & 0 & 0 \\ 0 & 1 & 1 & 0 & 0 \\ 1 & 0 & 0 & 1 & 0 \\ 0 & 0 & 1 & 1 & 1 \\ 0 & 0 & 1 & 0 & 1 \end{bmatrix} \cdot \begin{bmatrix} x_1 \\ x_2 \\ x_3 \\ x_4 \\ x_5 \end{bmatrix} = \begin{bmatrix} 95 \\ 115 \\ 130 \\ 210 \\ 100 \end{bmatrix}$$

The latter may also be written as $D \cdot x = v$, wherein D, x and v represent the corresponding matrix and vectors of the equation above. The above equation may be solved by multiplying left and right by the inverse of the matrix D. In this example, that inverse is the following matrix $$\begin{bmatrix} 0 & 0 & 1 & -1 & 1 \\ 1 & 0 & -1 & 1 & -1 \\ -1 & 1 & 1 & 1 & 1 \\ 0 & 0 & 0 & 1 & -1 \\ 1 & -1 & -1 & 1 & 0 \end{bmatrix}$$

Multiplying the above inverse matrix with the vector that contains the energy use increase, in this case vector v, that gives the following solution for vector x:

$$x = \begin{bmatrix} 20 \\ 75 \\ 40 \\ 110 \\ 60 \end{bmatrix}$$

For example, if it were known from, e.g., a lighting plan, that the second lighting zone ought to have four units of 25 Watt each, then the following shows that that lighting zone now consumes only 75 W. This likely corresponds to a broken lighting unit. As another example, it may be known from the baseline, e.g., the lighting plan that the fourth lighting zone ought to contain four units of 15 W each, e.g., LED lamps. The observed power-on usage is 50 W higher than expected. This suggests that an installation error occurred here. Likely, a planned replacement by energy efficient LED lamps did not happen. As a final example, the fifth lighting zone may comprise four lighting unit of 17 W each, according to the base line, e.g., a previous measurement made, say, a year ago. It can be seen that the lighting units now consume only 60 W rather than 68 W. This may indicate that the lighting units in the fifth lighting zone are deteriorating. Instead of a decrease in energy use, the system may also detect an increase in energy use. In all of these examples, the system may send an alert signal to the service staff to investigate the situation and/or repair the lighting zone.

In this example, the number of equations is equal to the number of unknown energy start-up uses of the lighting zones. In an embodiment, additional equations are used, to reduce any noise. In that case an overdetermined system is used. There are several knows ways to solve an overdetermined system. For example, one may compute the least squares approximation to the solution, e.g., by multiplying left and right with the transpose of the matrix D, e.g., by solving the normal equation. For example, one may multiply left and right by the pseudo-inverse, etc.

Many different ways of executing the method are possible, as will be apparent to a person skilled in the art. For example, the order of the stages can be varied or some stages may be executed in parallel. Moreover, in between stages other method stages may be inserted. The inserted stages may represent refinements of the method such as described herein, or may be unrelated to the method. For example, some stages may be executed, at least partially, in parallel. Moreover, a given stage may not have finished completely before a next stage is started.

A method according to the invention may be executed using software, which comprises instructions for causing a processor system to perform method 500, 530 and/or 540. Software may only include those stages taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing stages of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figures 6A, 6B:
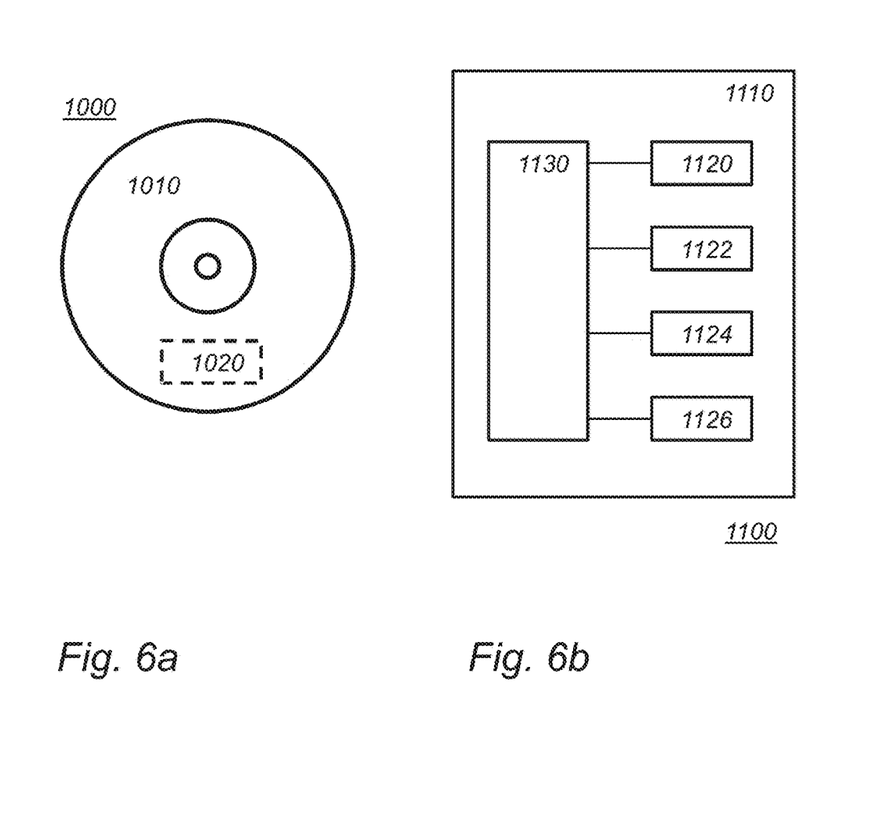
FIG. 6a shows a computer readable medium having a writable part comprising a computer program according to an embodiment of the invention.
FIG. 6b shows a schematic representation of a processor system according to an embodiment of the invention.

FIG. 7a shows a computer readable medium 1000 having a writable part 1010 comprising a computer program 1020, the computer program 1020 comprising instructions for causing a processor system to perform an energy measurement method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said energy measurement method.

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the energy measurement system may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. An energy measurement system for a lighting system, the lighting system comprising:
   multiple lighting units arranged in multiple lighting zones,
   multiple sensors associated with the lighting zones, and
   an energy measurement device,
   the lighting system being arranged to switch on a lighting zone depending on at least a sensor associated with the lighting zone,
   the energy measurement system comprising:
      a first receiver arranged for receiving sensor data from the multiple sensors, the sensor data indicating states of the multiple sensors at different times,
      a second receiver arranged for receiving energy use data from the energy measurement device, the energy use data indicating an aggregated energy use of the multiple lighting zones at different times, and a processor circuit arranged for
obtaining multiple pairs of a set of sensor identities and a corresponding energy use increase, said obtaining comprising:
determining from the sensor data a switching event during which one or more sensors of the multiple sensors changed state indicating switching on one or more associated lighting zones, and determining an identity of the one or more sensors which changed state,
determining an energy use increase associated with the switching event from the energy use data as the difference between an energy use after the switching event and an energy use on or before the switching event; and
obtaining power-on energy uses of the multiple lighting zones associated with the multiple sensors from the multiple pairs by relating the energy use increase with a corresponding power-on energy use of the lighting zones associated with the one or more sensor identities in the sets of sensor identities.

2. An energy measurement system as in claim 1, wherein obtaining the power-on energy uses of the multiple lighting zones comprises:
representing the multiple pairs as multiple equations, an equation relating the one or more sensor identities to the corresponding energy use increase, wherein the power-on energy use of the lighting zones associated with the one or more sensor identities are unknowns, and
solving the multiple equations to obtain the power-on energy uses of the lighting zones.

3. An energy measurement system as in claim 1, wherein the processor circuit is arranged to determine from the sensor data multiple sensors that changed state indicating activating one or more lighting zones within a time period having a duration of at most a threshold activating period, so that the switching event has a duration of at most the threshold activating period, the energy use increase associated with the switching event being determined as the difference between an energy use after the last sensor in the switching event changed state and an energy use on or before the first sensor in the switching event changed state.

4. An energy measurement system as in claim 1, wherein the processor circuit is arranged to
determine from the sensor data if a sensor of the multiple sensors changed state indicating switching off one or more associated lighting zones during the switching event, and if so to disregard the switching event.

5. An energy measurement system as in claim 1, wherein the processor circuit is arranged to:
determine if a sensor changed state in a following measurement period after the last state change of a sensor in the switching event, and if so to disregard the switching event, and/or
determine if a sensor changed state in a preceding measurement period before the first state change of a sensor in the switching event, and if so to disregard the switching event.

6. An energy measurement system as in claim 1, wherein at least some of the sensors are occupancy sensors.

7. An energy measurement system as in claim 1, wherein the processor circuit is arranged to compute a minimum expected energy use for the switching event, and to disregard the switching event if the minimum expected energy use is below the energy use increase determined from the energy use data.

8. An energy measurement system as in claim 1, wherein the processor circuit is arranged to:
subtract the determined power-on energy use ($x_1$) of the lighting zones from a base line power-on energy use ($x_2$) of the lighting zones,
determine a lighting zone for which said subtraction exceeds a threshold ($x_1-x_2>D$; $x_2-x_1>D$),
send an alarm signal indicating said determined lighting zone.

9. An energy measurement system as in claim 1, wherein the equations are linear equations, an equation indicating an equality between a sum of the unknown power-on energy uses of the lighting zones associated with the one or more sensor identities and the corresponding energy use increase.

10. An energy measurement system as in claim 1, wherein the multiple equations are overdetermined.

11. A lighting system comprising an energy measurement system according to claim 1, multiple lighting zones, multiple sensors associated with the lighting zones, and an energy measurement device, the lighting system being arranged to switch a lighting zone on depending on at least the sensor associated with the lighting zone, the lighting system comprising a first transmitter arranged for transmitting sensor data from the multiple sensors to the energy measurement system, the sensor data indicating a state of the multiple sensors at different times, and a second transmitter arranged for transmitting energy use data from the energy measurement device to the energy measurement system, the energy use data indicating an aggregated energy use of the multiple lighting zones at different times.

12. An energy measurement method for a lighting system, the lighting system comprising:
multiple lighting units arranged in multiple lighting zones,
multiple sensors associated with the lighting zones, and
an energy measurement device,
the lighting system being arranged to switch on a lighting zone depending on at least the sensor associated with the lighting zone,
the energy measurement method comprising:
receiving sensor data from the multiple sensors, the sensor data indicating states of the multiple sensors at different times,
receiving energy use data from the energy measurement device, the energy use data indicating an aggregated energy use of the multiple lighting zones at different times,
obtaining multiple pairs of a set of sensor identities and a corresponding energy use increase, said obtaining comprising:
determining from the sensor data a switching event when one or more sensors of the multiple sensors changed state indicating switching on one or more associated lighting zones, and determining an identity of the one or more sensors which changed state,
determining an energy use increase associated with the switching event from the energy use data as the difference between an energy use after the switching event and an energy use on or before the switching event,
obtaining the power-on energy uses of the multiple lighting zones associated with the multiple sensors from the multiple pairs by relating the power-on energy use of the lighting zones associated with the one or more sensor identities in the sets of sensor identities with the corresponding energy use increase.

13. A computer readable medium comprising non-transitory data representing instructions to cause a processor system to perform the method according to claim 12.

* * * * *